United States Patent [19]

Bland

[11] Patent Number: 4,817,388
[45] Date of Patent: Apr. 4, 1989

[54] ENGINE WITH PRESSURIZED VALVED CELL

[76] Inventor: Joseph B. Bland, P.O. Box 1098, Solvang, Calif. 93463

[21] Appl. No.: 97,606

[22] Filed: Sep. 16, 1987

Related U.S. Application Data

[63] Continuation-in-part of Ser. No. 835,645, Mar. 3, 1986, abandoned.

[51] Int. Cl.$^4$ .............................................. F02B 19/18
[52] U.S. Cl. ........................................ 60/721; 60/712; 123/286; 123/292; 123/662
[58] Field of Search ................ 123/286, 662, 292; 60/650, 682, 370, 407, 412, 712, 721

[56] References Cited

U.S. PATENT DOCUMENTS

| | | |
|---|---|---|
| 827,989 | 12/1906 | Weidmann . |
| 887,703 | 5/1908 | Sharpneck ........................ 123/292 |
| 1,059,604 | 4/1913 | Gaff . |
| 1,533,387 | 4/1925 | Chapman . |
| 1,621,732 | 3/1927 | Lovejoy . |
| 1,911,991 | 5/1933 | Cosby . |
| 2,198,021 | 4/1940 | Wood . |
| 2,594,845 | 4/1952 | Baumann . |
| 3,148,668 | 9/1964 | Bianchi . |
| 3,363,612 | 1/1968 | Brenneke . |
| 3,724,432 | 4/1973 | Tonnessen . |
| 3,880,126 | 4/1975 | Thurston et al. . |
| 4,040,400 | 8/1977 | Kiener . |
| 4,458,635 | 7/1984 | Beasley . |

Primary Examiner—Allen M. Ostrager
Attorney, Agent, or Firm—Christie, Parker & Hale

[57] ABSTRACT

An internal combustion engine has an auxiliary cell connected thereto by a transfer valve. Approximately isothermally compressed gas, which may be a combustible mixture, is introduced into the cell through an input valve. A displacer piston in the cell is biased toward lower volume of the cell. In an illustrated embodiment, the displacer piston is translated by the compressed gas toward a larger volume in the cell. When the cell is fully charged with compressed gas, the input valve is closed and the transfer valve is opened for intermittently discharging the mass of gas in the cell into the cylinder of the internal combustion engine. The displacer piston displaces substantially all of the gas from the cell into the engine. Combustion is initiated and may, at least in part, occur within the cell, providing power to the engine as the gas expands and performs work by way of the engine piston. A two-stroke engine where the cell provides a compressed combustible mixture to the cylinder has enhanced efficiency since gas can be isothermally compressed instead of being compressed by the engine piston.

22 Claims, 7 Drawing Sheets

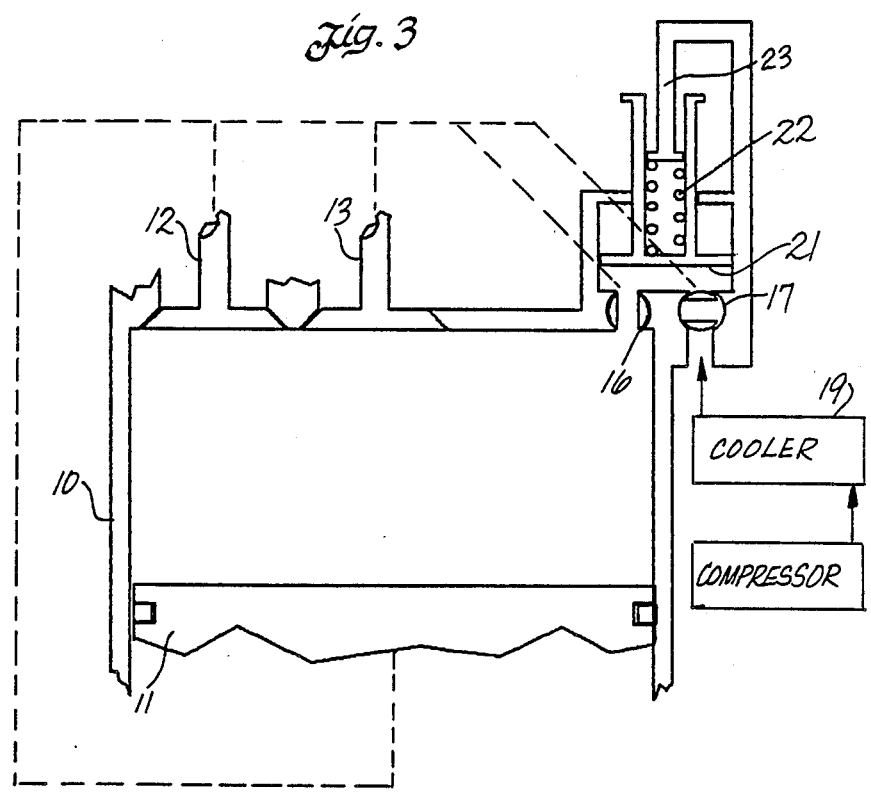

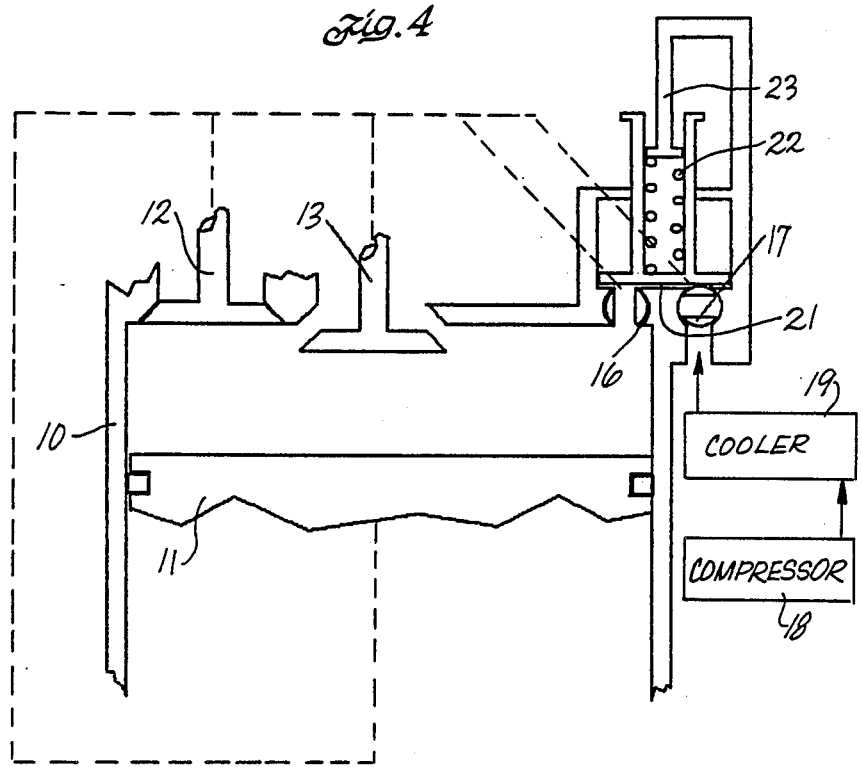

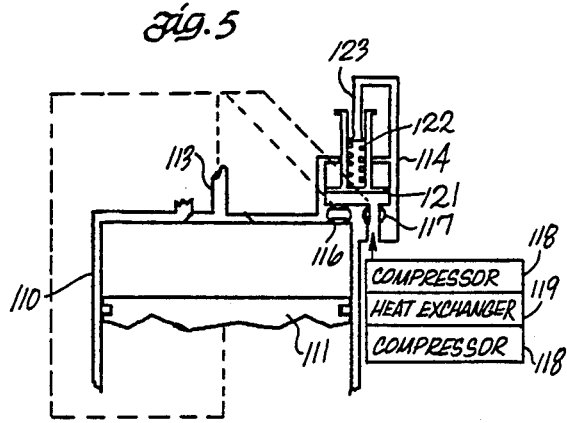
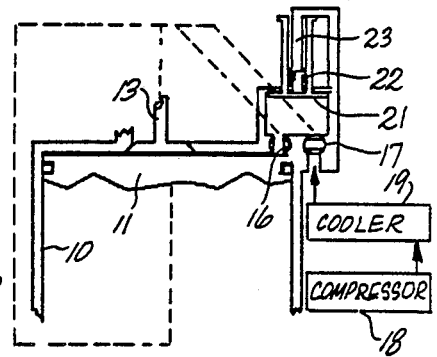
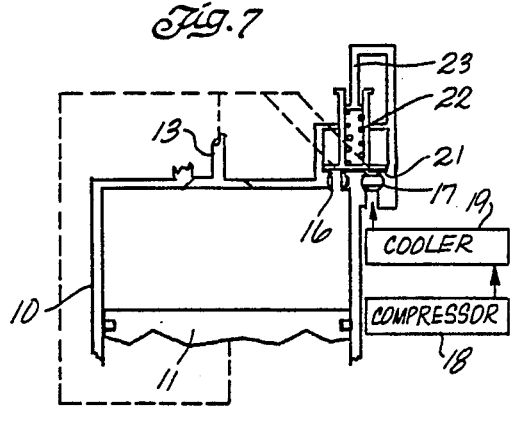
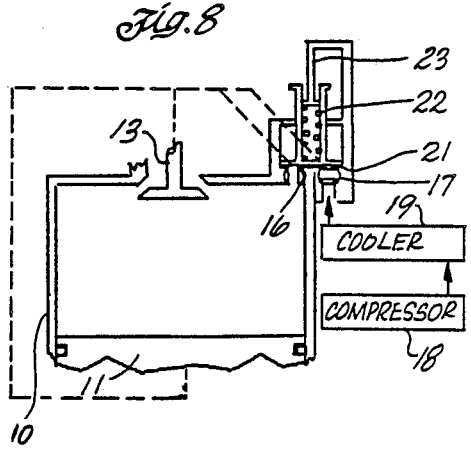

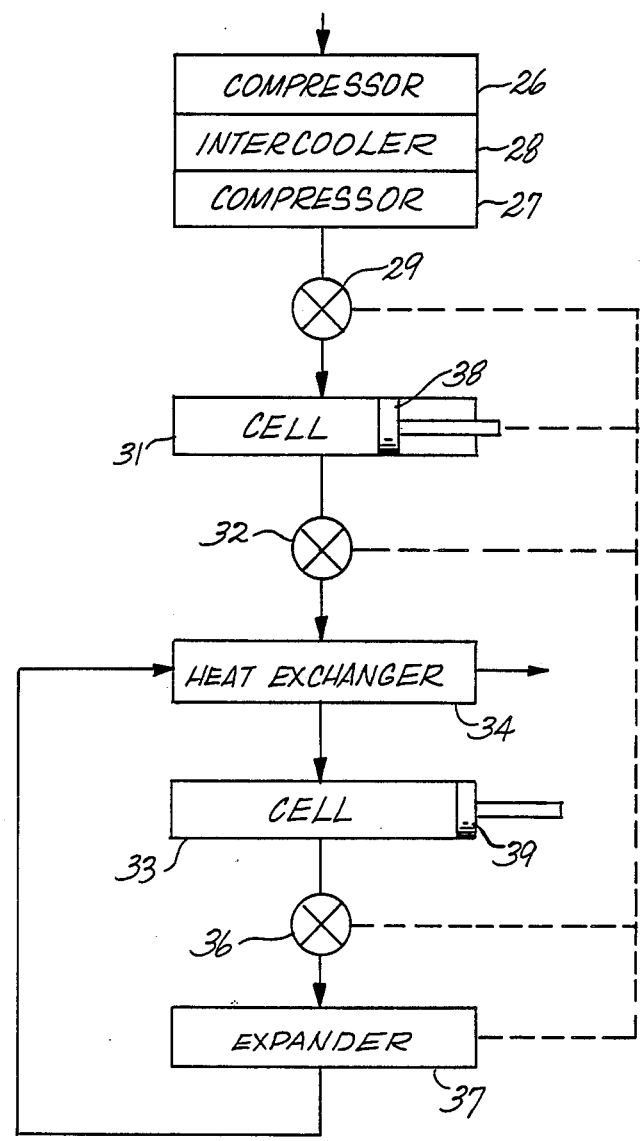

ENGINE WITH PRESSURIZED VALVED CELL

RELATED APPLICATION

This application is a continuation-in-part of my U.S. patent application Ser. No. 835,645, filed Mar. 3, 1986, entitled Independently Pressurized Valved Cells as Applied to Heat Engine Process, now abandoned. The subject matter of this parent application is hereby incorporated by reference as if set forth in full herein.

FIELD OF THE INVENTION

This invention relates to an internal combustion engine having an auxiliary combustion chamber for augmented power and more broadly to a pressurized valved cell for other heat engines.

BACKGROUND OF THE INVENTION

An internal combustion engine of either the Otto or Diesel variety has an essentially constant maximum displacement or volume. This requires compromises in design to achieve acceptable power output at full throttle and reasonable thermal efficiency at cruising power. It would be desirable to have an engine with differing displacements for those operating conditions. However, the mechanical constraints of a conventional combustion engine do not permit of that possibility.

It is also desirable to separate the process of generating expandable fluid for an engine and the expansion of such fluid. This permits each of the two processes to be more closely optimized. Compression of fluid can be more nearly isothermal, and expansion which approaches truly isentropic expansion may be provided. It may be desirable to avoid recompression of combustion products which costs power. It would also be desirable to recapture heat in the combustion products for enhancing thermal efficiency of an engine.

BRIEF SUMMARY OF THE INVENTION

There is, therefore, provided in practice of this invention according to a presently preferred embodiment a method of operating an engine comprising the steps of compressing a gas to a pressure approximately the same as a pressure in the engine, temporarily isolating a mass of the compressed gas, and opening communication between the isolated gas and the engine while the isolated gas is at approximately the same pressure as in the engine for intermittently releasing substantially all of the temporarily isolated mass of gas into the engine for expansion.

This method of operating can be performed in an internal combustion engine having a conventional cylinder and piston with at least one valve for admitting a combustible mixture into the cylinder and exhausting combustion products therefrom. An auxiliary cell with a displacer piston is connected to the cylinder by a transfer valve. The displacer piston is biased by either a spring or positive device such as a cam for displacing substantially all of the contents of the cell into the cylinder. During a cycle, an input valve to the cell is opened for introducing compressed gas during either the intake or compression stroke, or both. The input valve is closed before the beginning of the power stroke of the piston. The transfer valve between the cell and cylinder is opened at about the beginning of the power stroke. Pressurized gas from the cell augments or provides power for the power stroke of the engine. By the end of the exhaust stroke of the engine, the transfer valve is closed. Meanwhile the displacer piston has displaced substantially all of the gas from the cell into the cylinder. The cycle repeats beginning with the intake stroke.

A novel two stroke engine can be constructed with essentially all of the power provided via the compressed gas from a valved cell. Such a construction may also permit regenerative exhaust heat exchange.

BRIEF DESCRIPTION OF THE DRAWINGS

These and other features and advantages of the present invention will be appreciated as the same becomes better understood by reference to the following detailed description, when considered in connection with the accompanying drawings, wherein:

FIG. 3 illustrates the engine of FIG. 1 at the end of the power stroke;

FIG. 4 illustrates the engine of FIG. 1 during the exhaust stroke;

FIG. 5 illustrates schematically a two-cycle engine with a valved cell during a compression stroke;

FIG. 6 illustrates the engine of FIG. 5 with the piston at top dead center;

FIG. 7 illustrates the engine of FIG. 5 during the power stroke;

FIG. 8 illustrates the engine of FIG. 5 with the piston at bottom dead center;

FIG. 9 illustrates schematically an expansion engine with a pair of cells for temporarily isolating and intermittently releasing gas;

DETAILED DESCRIPTION

Figure 1:
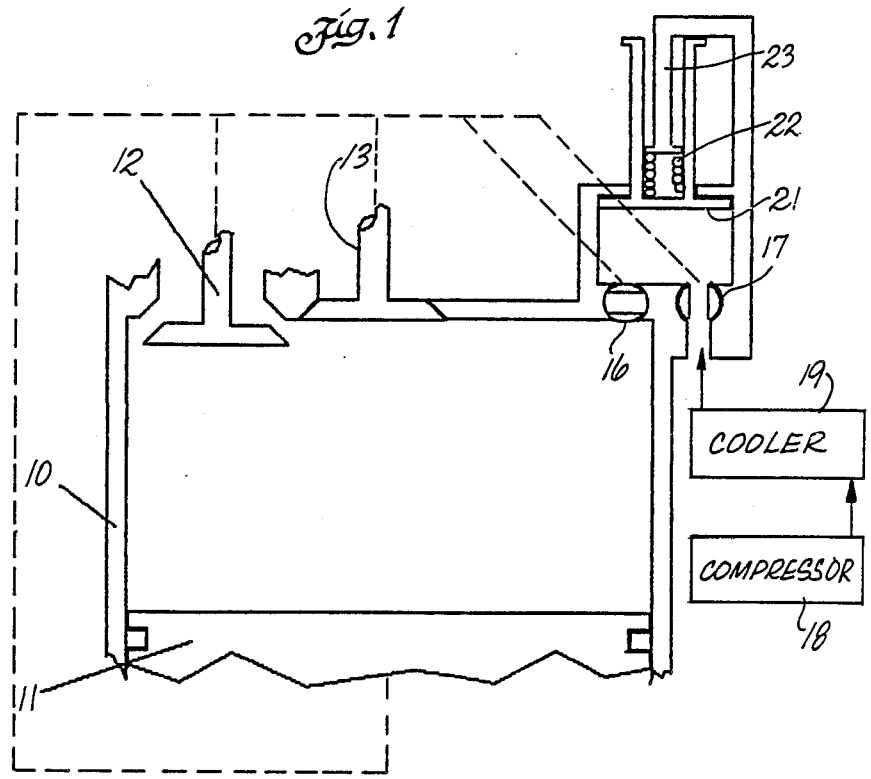
FIG. 1 is a semi-schematic cross-section of an internal combustion engine constructed according to principles of this invention at the end of its intake stroke.

FIG. 1 illustrates largely schematically an internal combustion engine suitable for practice of this invention. Only one cylinder 10 and power piston 11 for such an engine is illustrated. It will be understood that this is merely representative of one of a plurality of such structures that make up such an engine. Other portions of the engine are conventional. Thus, the crankshaft, camshaft, etc., of the engine are not specifically illustrated, but instead, the mechanical interconnection to coordinate operation of the engine, transmit power, etc., are merely indicated by dashed lines.

Each cylinder in the engine has an intake valve 12 illustrated in its open position in FIG. 1, and an exhaust valve 13 illustrated in its closed position. A spark plug for the cylinder is not indicated in the drawing and it will be understood that the internal combustion engine may operate on either an Otto or Diesel cycle. This description is in the context of an Otto cycle.

Each cylinder of the engine has a cylindrical valved cell 14. For purposes of the schematic illustration, the valved cell is illustrated integral with the cylinder. All that is required is as short a fluid communication as possible, and in an actual embodiment such a cell is not made integral with the cylinder or head. A transfer valve 16, shown in its closed position in FIG. 1, interconnects the cell and cylinder. An input valve 17 interconnects the cell with a compressor 18 by way of an intercooler or heat exchanger 19. The compressor may, for example, be a conventional supercharger or turbocharger or other suitable gas compressing structure. A single such compressor may be used for all of the valved cells of a multiple cylinder engine. Rotary valves 16 and 17 are illustrated in this embodiment since easily actuated with a substantial pressure difference across them. Other types of valve structure may also be employed.

The valved cell includes a displacer piston 21. In this embodiment, the displacer piston is biased by a compression coil spring 22 which abuts against a rigid structure 23 forming a part of the engine and illustrated only schematically in this drawing. The spring biases the displacer piston toward the inlet and transfer valves, thereby tending to reduce the internal volume of the cell.

Four different stages of operation of the internal combustion engine are represented schematically in FIGS. 1 through 4. In FIG. 1, the power piston 11 is near or at bottom dead center at the end of the intake stroke, and the inlet valve 12 is open for admitting a combustible mixture into the cylinder. The transfer valve 16 between the cell and cylinder is closed and the input valve 17 to the cell is open. This permits compressed gas to enter the cell from the compressor. As the gas pressure in the cell rises, the spring 22 is compressed as the displacer piston is driven back by the increased gas pressure. In an exemplary embodiment, gas pressure in the cell is about 150 psi and the spring constant is selected so that the spring is fully compressed at a lower pressure, such as 130 psi.

The compressed gas in the cell in this embodiment is a combustible mixture of air and fuel. Fuel is introduced into the compressed air after the air leaves the cooler 19. A conventional fuel injection port (not shown) may be used.

Introduction of compressed gas into the cell may occur during the engine intake stroke or the compression stroke, or both. When a full charge of compressed gas has been introduced into the cell, the input valve 17 is closed. This may occur any time before the end of the compression stroke of the power piston. Typically, there is at least a moment when both the input valve and the transfer valve are closed, isolating the mass of compressed gas in the cell.

Figure 2:
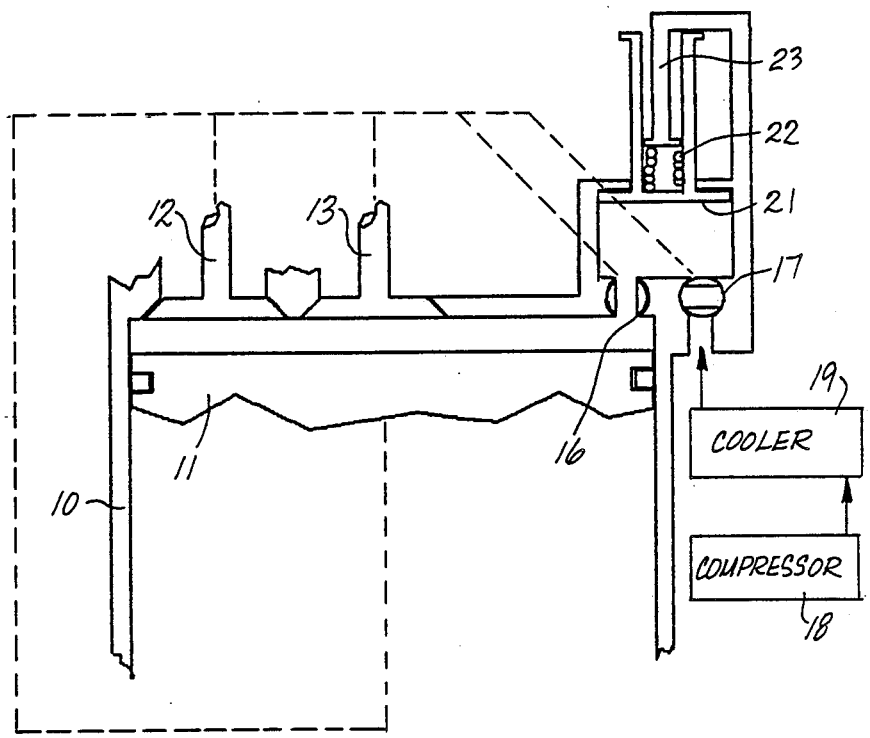
FIG. 2 illustrates the engine of FIG. 1 at the end of the compression stroke.

FIG. 2 illustrates the engine with the power piston 11 at or near top dead center. At about this time, the transfer valve is opened. Preferably, the transfer valve is opened when pressure in the cell and cylinder are approximately the same. This eases the opening force on the transfer valve. This virtually requires that the transfer valve open before combustion commences in the main cylinder.

In an exemplary embodiment, the mass of compressed gas in the cell is about equal to the mass of combustible mixture in the cylinder. The volume of the cell may be smaller than the cylinder because of temperature differences. Typical temperature in the cell is about 300° F. In the cylinder, on the other hand, with a pressure of about 150 psi, the temperature is in the order of 750° F.

With the transfer valve open, combustion is initiated in the cylinder by a spark in the Otto cycle or by compression in the Diesel cycle. Combustion occurs in both the cylinder and the combustible mixture in the cell. Thus, the effective mass of combustible mixture is roughly twice what it would be in the absence of the valved cell. It will be recognized, of course, that different relative volumes of the cell and cylinder may be employed. Further, different fuel:air mixture ratios may be used in the cell and cylinder as appropriate for efficient combustion and expansion, avoidance of burning of the transfer valve, and the like.

FIG. 3 illustrates the engine as the power piston is near or at bottom dead center. At the end of the power or expansion stroke. The transfer valve between the cell and cylinder remains open for permitting continued gas flow from the cell into the cylinder during combustion and expansion of the gas. Pressure in the cylinder decreases to about 70 psi before the exhaust valve opens. As the pressure decreases, the spring 22 biasing the displacer piston in the cell moves the displacer piston toward reduced volume of the cell and discharge of gas from the cell into the enlarged cylinder volume.

At this point, the exhaust valve 13 opens, as illustrated in FIG. 4, and pressure in the cylinder rapidly decreases toward atmospheric. As the exhaust stroke continues, the transfer valve remains open and the displacer piston displaces substantially all of the gas from the valved cell. When the displacer piston reaches the end of the cell, the transfer valve can be closed and the cycle.

With such an embodiment, the cylinder and piston of the engine form an expander which does useful work as the hot, compressed gases expand. By using the valved cell containing a combustible mixture, the expander is presented with a charge of fuel and air for expansion which may be nearly isothermally compressed which is more efficient than the roughly adiabatic process occurring in the cylinder of the internal combustion engine.

As will be apparent, the displacer piston in the cell is essentially passive. That is, it does not of itself compress the charge of gas in the cell. The compression having occurred external to the cell and preferably nearly isothermally. The purpose of the displacer piston is to assure that substantially all of the gas is displaced from the cell when the transfer valve is open. During the portion of the cycle when the input valve is open, the piston reacts to the compressed gas entering the cell. In other embodiments, instead of using a compression spring, the piston position may be controlled by a cam with a light. The cam timing is coordinated so that the piston remains passive and does not effect substantial compression of the gas in the cell.

When the engine is operating at partial loads, the valved cell (or prechamber) is not used and the engine operates in a conventional manner. Since the valved cell is essentially on standby waiting for a demand for additional power from the engine, the throttle setting for the engine at a given cruising speed is relatively high for high thermal efficiency. Power variations may be obtained in this mode of operation by conventional means. However, when a full throttle acceleration is desired, for example, operation of the valved cell is initiated. This, in effect, augments the power available from the engine by increasing its effective displacement. The added displacement is fed with isothermally compressed gas rather than adiabatically compressed gas. Further, this gas can be a fuel-air mixture undiluted by combustion products from the previous cycle. This mode of "supercharging" enhances power while retaining better thermal efficiency. Further, by decreasing the air:fuel ratio of the combustible mixture within the valved cell below that of the main cylinder, a stratified charge effect is obtained by means quite different from conventional stratified charge engines.

FIGS. 5 through 8 illustrate four different stages of operation of a novel two-cycle internal combustion engine connected to a valved cell. In this embodiment, parts of the structure are identified with reference numerals 100 larger than the corresponding reference numerals for like parts in the embodiment illustrated in FIGS. 1 through 4. Thus, for example, the cylinder in this embodiment is indicated by reference numeral 110, corresponding to the cylinder 10 in FIG. 1. The power piston 111 and valved cell 114 are essentially the same as in the previous embodiment. This embodiment differs, however, in having only an exhaust valve 113. As in the previous embodiment, a fuel-air mixture is introduced into the valved cell through an input valve 117.

Introduction of gas into the cell occurs during an upward stroke of the engine as illustrated in FIG. 5. If desired, the engine exhaust valve may be left open during a portion of the upward stroke for discharging most of the remnant combustion products in the cylinder as the volume decreases. It is desired that the volume of remnant gases compressed be minimized, but also that the pressure in the cylinder when the piston reaches top dead center (FIG. 6) is about the same as the pressure of the combustible mixture in the valved cell. By employing a very small head space over the piston at top dead center, a relatively small amount of remnant gas may be compressed to achieve equal pressures.

When the pressures are equal and the piston is at or near top dead center, as illustrated in FIG. 6, the transfer valve 116 between the cell and cylinder is open, thereby exposing the prepressurized combustible mixture within the valved cell to the cylinder. At this time, combustion is initiated in the combustible mixture either by a spark or by continued elevation of pressure. Combustion pressures force the power piston downwardly in a power or expansion stroke which creates work in the usual fashion against the crankshaft (not shown).

At some point either during the engine expansion stroke or during the following engine exhaust portion of he cycle, the pressure in the engine cylinder drops below the pressure which retains the displacer piston 121 at its full stroke against the biasing spring 122. At this crossover, the displacer piston displaces remaining gas from the valved cell into the engine cylinder, as illustrated in FIG. 7.

The engine exhaust valve 113 opens at or near bottom dead center, as illustrated in FIG. 8, and decompression occurs from the cylinder. When pressure in the cylinder has decreased to the point the displacer piston has traveled its full stroke for exhausting the cell, the transfer valve is closed. The input valve to the cell can then be opened for introducing a new charge of pressurized combustible mixture, recompressing the displacer piston spring in the process and restoring the engine to its original condition for the beginning of a new power stroke.

In this embodiment of two stroke engine, only one valve is needed for exhausting combustion products from the cylinder. The fuel-air mixture is introduced thrugh the valved cell, mechanically coordinated with stroke of the power piston. Excellent thermal efficiency is obtainable with such an engine.

FIG. 9 illustrates in block form another embodiment of valved cell engine with exhaust heat regeneration. As illustrated in this embodiment, input gas for the engine is compressed by staged compressors 26 and 27 with an intercooler 28 to better approach isothermal compression for preferred efficiency. The compressed gas may be inlet air or a combustible mixture. In the former case, fuel is added to the compressed air later in the cycle.

The compressed gas passes through a valve 29 into a first valved cell 31. Gas is intermittently transferred from the first cell thrugh a valve 32 to a second valved cell 33. En route between the two cells, the gas passes at constant volume through an exhaust gas regenerator or heat exchanger 34. From the second cell the gas is intermittently released through a transfer valve 36 to an expander 37 which may be a cylinder and piston of an internal combustion engine as hereinabove described, or may be a more continuous expander such as a gas turbine. Exhaust gas from the expander is recycled to the exhaust gas regenerator 34 for preheating the inlet gas.

Mechanical coupling, indicated by dashed lines in the drawing, coordinates the opening and closing of the valves and the movement of the displacer pistons in the two-valved cells. In the event the expander is a cylinder of an internal combustion engine, it, too, is mechanically coordinated with the inlet gas handling system.

At the beginning of an exemplary cycle, the first input valve 29 is opened and the valve 32 between the cells is closed. Compressed gas flows from the compressors into the first cell 31, tending to move its displacer piston 38 toward increased volume in the cell. This displacer piston is mechanically coupled to the displacer piston 39 in the second cell, such as by a simple rocker arm, so that as volume in one cell increases, volume in the other cell decreases. Thus, the compressed gas entering the first cell tends to displace gas from the second cell. As will appear, the gas in the second cell is at a higher pressure than gas in the first cell, and augmented force may be required to expel the gas from the second cell. This may be avoided by appropriate selection of the piston areas and strokes in conjunction with the inlet compressed gas pressure and pressure encountered in the expander. Ordinarily pressure in the expander is, or becomes, less than the pressure in the second cell, and expansion rapidly occurs without assistance.

With a full charge of compressed gas is present in the first cell, its input valve 29 is closed and the valve 32 between the two cells is opened. Pressure in the two cells equalizes and motion of the displacer pistons in the two cells is reversed, thereby displacing gas from the first cell to the second cell. Since the displacer pistons are coupled, temperature of the gas passing through the exhaust gas regenerator 34 is increased at constant volume. When substantially all of the gas has been transferred between the cells and preheated in the process, the valve 32 between the cells is closed and the transfer valve 36 between the second cell and the expander is opened. The input valve 29 to the first cell is also opened and the cycle is repeated as compressed gas enters the first cell while gas from the second cell flows to the expander.

Such a system with isothermal compression of an inlet mixture, constant volume preheating of inlet gas by exhaust gas regeneration, and intermittent expansion from a valved cell has a substantially greater theoretical thermal efficiency than a standard Otto cycle engine.

Figure 10:
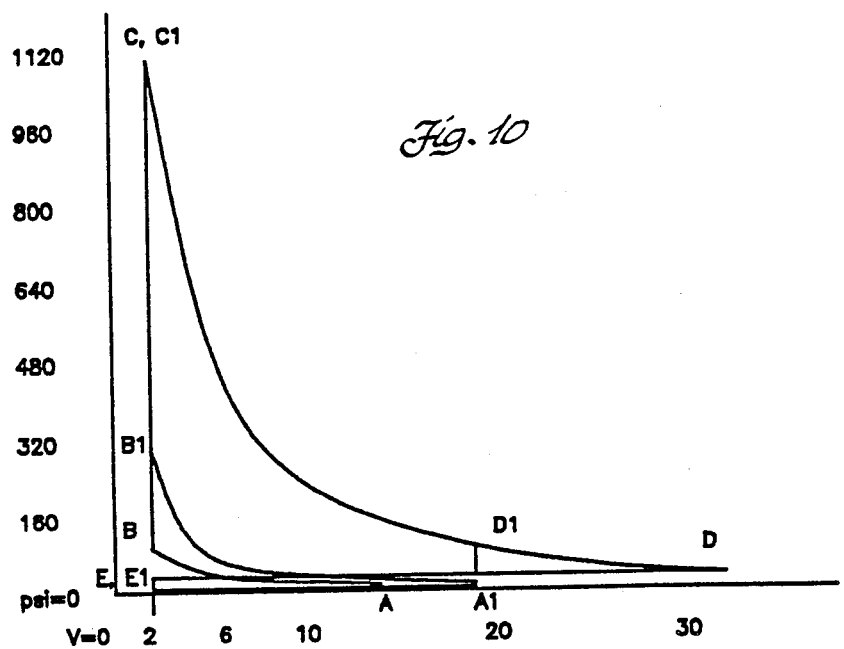
FIG. 10 is a pressure-volume diagram for showing states of fluid in an engine.
Figure 11:
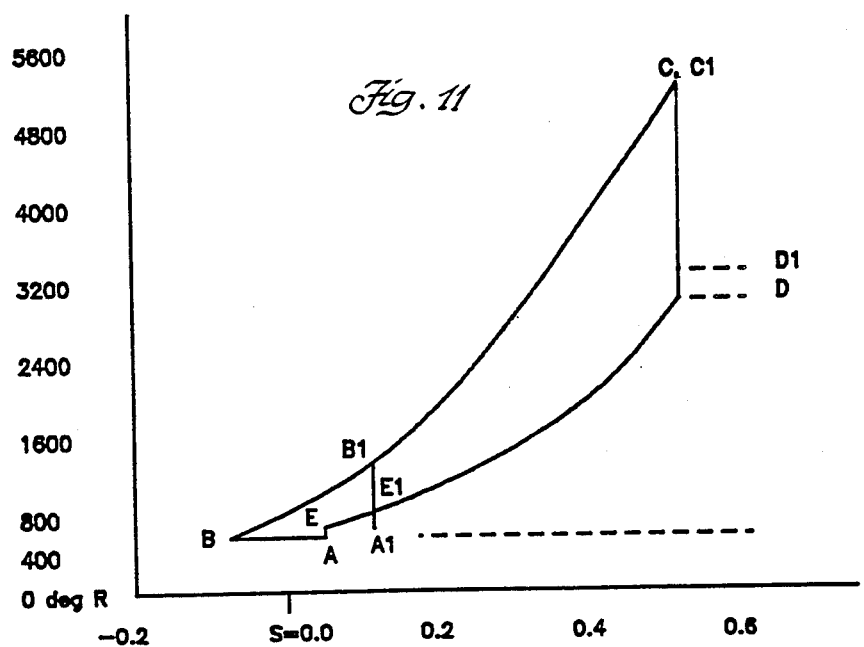
FIG. 11 is a temperature-entropy diagram for showing states of fluid in an engine.

FIG. 10 is a pressure-volume diagram comparing the ideal fluid states of a standard uncooled Otto cycle internal combustion engine and a similar uncooled Otto cycle engine with a total combustible mixture passed through valved cells in an arrangement as illustrated in FIG. 9. FIG. 11 is a temperature-entropy diagram for the same two engines.

FIGS. 10 and 11 have been extrapolated (from Hershey, Eberhardt, and Hottel, *TRANS. SAE*, Volume 39, 1936) for ideal fluid states. States A, B, C, D, and E are representative of the path followed by the gas in the valved cell engine. Points A1, B1, C1, D1 and E1 are representative of the path followed by the combustible mix in a standard engine.

In both cases it is assumed that the entire mixture follows the pressure-volume-temperature relationships. In a practical engine, there are obviously imperfections in the cycle, and complete exhaust gas regeneration is infeasible for the entire combustible mixture. The temperature of the compressed and preheated gas would cause premature combustion of the combustible mixture. Thus, only the air would be fully preheated and the fuel would be injected at a different stage of the cycle. Regardless, the curves plotted in FIGS. 10 and 11, indicate that a greater ideal thermal efficiency is possible in the valved cell engine than a standard Otto cycle.

In these diagrams, states A and A1 represent the states of the combustible mixture at 14.7 psi. These two points are different in the pressure-volume diagram since the volume of the valved cell engine is about 14 cubic feet versus 19 cubic feet for the standard engine. This results from residual combustion gases in the standard engine following exhaust, mixing with a fresh charge of combustible mixture in a standard cycle. In the two-cycle engine, as illustrated in FIGS. 5 through 8, operated with two valved cells as illustrated in FIG. 9, there is virtually no high temperature fluid remaining in the cylinder for mixing with the combustible mixture from the cell in the valved cell engine. Thus the same amount of combustible mixture takes up less volume in the valved cell engine. Further, the gas has a lower entropy because of its somewhat lower temperature and smaller volume.

States B and B1 represent the states of the combustible mixture following compression. The relatively low pressure of the combustible mixture in the valved cell engine is due to removal of heat during isothermal compression. Since compression is ideally isothermal, there is less compression energy required by the valved cell engine than the standard Otto cycle. Such isothermal compression, of course, results in a lower temperature B in the valved cell engine than the temperature B1 of the compressed gas in the standard Otto cycle.

States C and C1 represent the states of the combustible mixture at the beginning of expansion. A substantial amount of the energy of the gas in the valved cell engine is achieved by constant volume heat input by exhaust gas regeneration. More heat energy is added to the valved cell engine to achieve this state because of the lower temperature and pressure following isothermal compression. Alternatively the state C can be reached by constant pressure heat exchange.

States D and D1 represent the states of the combusted mixture following isentropic expansion, i.e., during the power stroke of the engine. In a standard engine, the combusted mixture expands to about 100 psi because it expands to the same volume it compresses from. A valved cell engine, however, is not restricted in the degree of expansion since the volumes compressed from and expanded to can be arbitrarily chosen. Thus, in the ideal valved cell engine cycle, the combusted mixture can expand to about 30 psi. Furthermore, as can be seen in FIG. 11, the isentropic expansion is carried further *outside* the standard engine by decompression through the exhaust valve until the combusted mixture from the standard engine reaches the state (D) of the valved cell engine's combusted mixture.

States E and E1 in the diagrams represent a constant pressure exhaust from each engine at about 30 psi mean effective back pressure. However, in the valved cell engine a constant volume exchange of heat becomes feasible from the combusted mixture as it passes from state D to state E to the combustible mixture as it passes from state B toward state C. This is feasible since the mechanisms for compression and expansion are separated in the valved cell engine. They are not so separated in a standard Otto cycle where compression and expansion both occur in the cylinder. The exhaust heat is essentially wasted, however, some gain in efficiency can be obtained with a turbocharger.

From the classis Carnot cycle where $(T_1-T_2)/T_1$ equals the potential thermal efficiency, it can be seen that the potential efficiency of the standard Otto cycle engine is about $(5,200-3,400)/5,000$ (degrees Rankine)$=0.346$ or a little less than 35%.

Again, calculating the potential thermal efficiency of the valved style engine as a Carnot cycle, a value of $(5,200-560)/5,200$ equals 0.892 or almost 90%. The ideal thermal efficiency of the two-cycle engine with two valved cells, isothermal compression and constant volume exhaust gas regeneration, is about 2 ½ times that of a standard Otto cycle. As point out above, in neither of these engines can the theoretical thermal efficiency be obtained. With a such a higher potential efficiency, however, the actual efficiency of such an engine can be notably improved by comparison with a standard engine.

Although limited embodiments of valved cell engines have been described and illustrated herein, many modifications and variations will be apparent to one skilled in the art. The specific mechanical arrangements of such engines are subject to a broad variety of implementations based on the schematic illustrations provided herein. Variations of the operations may be provided as well. For example, in the embodiments illustrated in FIGS. 1 through 8, the displacer piston is biased toward reduced voume in the cell by a compression spring. However, as suggested by the embodiment illustrated in FIG. 9, the displacer piston can be positively displaced toward reduced volume by a mechanical linkage such as a cam, rocker, or the like. Rotary valves are illustrated since easily operated. Clearly, poppet or other types of valves may be employed as desired.

The valved cells described and illustrated have constant displacement. The displacement of such cells can also be made adjustable by providing adjustable stops for the stroke of the displacer piston.

Many other modifications and variations will be apparent to one skilled in the art and it is therefore to be understood that within the scope of the appended claims, the invention may be practiced otherwise than as specifically described.

What is claimed is:

1. An two-stroke engine comprising:
    an expansion chamber capable of undergoing the cycles of expansion and exhaust;
    a cell separate from the expansion chamber but in immediate proximity to the expansion chamber;
    means for compressing a gas external to the expansion chamber;
    a cell inlet valve means connecting the externally compressed gas and the cell;

a transfer valve means connecting the cell and the expansion chamber;

exhaust valve or port means within the expansion chamber;

heat input means for increasing the molecular activity of the externally compressed gases over the molecular activity of the gases following external compression;

linkage means for supplying power from the expansion means to the desired work load, the external compressor means, the valve actuation means and any auxiliary power means required for engine operation for:
(a) opening the cell inlet valve to admit externally compressed gas when substantially all of the gas within the cell has been exhausted into the expander;
(b) closing the cell inlet valve before the opening of the transfer valve;
(c) closing the exhaust valve before the completion of the exhaust cycle to allow the remnant gases to be recompressed to substantially the pressure within the cell;
(d) opening the transfer valve when the pressure within the expansion chamber and the pressure within the cell are substantially the same; and
(e) closing the transfer valve following the transfer of substantially all of the externally compressed gas into the expander.

2. An engine as recited in claim 1 wherein the maximum volume of the cell may be varied.

3. An engine as recited in claim 1 wherein the cell contains a passive displacer piston biased toward decreased volume in the cell.

4. An engine as recited in claim 3 wherein means for biasing the displacer piston comprises a compression spring behind the piston with a spring constant for the spring wich permits full displacement of the piston at a pressure less than the pressure of the gas which enters the cell through the cell inlet valve.

5. An engine as recited in claim 1 wherein the cell contains an active displacer piston moving toward decreased volume in the cell at the same time and to the same degree volume is increased in the expansion chamber.

6. An engine as recited in claim 1 wherein the source of compressed gas comprises an approximately isothermal compressor.

7. An engine as recited in claim 1 wherein the source of compressed gas provided a combustible fuel:air mixture.

8. An engine as recited in claim 1 above wherein otherwise-waste engine heat is returned to the heat engine by absorption in the gas compressed externally to the heat engine.

9. An engine comprising:
an expansion chamber capable of undergoing the cycles of intake, compression, expansion and exhaust;
a cell separate from the expansion chamber but in immediate proximity to the expansion chamber;
means for compressing a gas external to the expansion chamber;
a cell inlet valve means connecting the externally compressed gas and the cell;
a transfer valve means connecting the cell and the expansion chamber;
exhaust valve or port means within the expansion chamber;
intake valve or port means within the expansion chamber;
heat input means for increasing the molecular activity of the compressed gases over the molecular activity of the gases following compression;
linkage means for supplying power from the expansion means to the desired work load, the external compressor means, the valve actuation means and any auxiliary power means required for engine operation for:
(a) opening the cell inlet valve to admit externally compressed gas when substantially all of the gas within the cell has been exhausted into the expander;
(b) closing the cell inlet valve before the opening of the transfer valve;
(c) closing the exhaust valve after the completion of the exhaust cycle;
(d) opening the intake valve;
(e) closing the intake valve after the completion of the intake cycle;
(f) compressing the gas within the expansion chamber taken in during the intake cycle;
(g) opening the transfer valve when the pressure within the expansion chamber and the pressure within the cell are substantially the same; and
(h) closing the transfer valve following the transfer of substantially all of the externally compressed gas.

10. An engine as recited in claim 9 wherein the maximum volume of the cell may be varied.

11. An engine as recited in claim 9 wherein the cell contains a passive displacer piston biased toward decreased volume in the cell.

12. An engine as recited in claim 11 wherein means for biasing the displacer piston comprises a compression spring behind the piston with a spring constant for the spring which permits full displacement of the piston at a pressure less than the pressure of the gas which enters the cell through the cell inlet valve.

13. An engine as recited in claim 9 wherein the cell contains an active displacer piston moving toward decreased volume in the cell at the same time and to approximately the same degree volume is increased in the expansion chamber.

14. An engine as recited in claim 9 wherein the source of compressed gas comprises an approximately isothermal compressor.

15. An engine as recited in claim 9 wherein the source of compressed gas provides a combustible fuel:air mixture.

16. An engine as recited in claim 9 above wherein otherwise-waste engine heat is returned to the heat engine by absorption in the gas compressed externally to the heat engine.

17. A method for efficiently transferring compressed gas into a heat engine which has cyclically-occurring changes in internal gas pressure comprising the steps of:
compressing a gas external to a heat engine expander undergoing cyclical changes in internal gas pressure;
maintaining a quantity of the compressed gas within a cell which is in immediate proximity to the heat engine expander when the heat engine expander has an internal gas pressure that is cyclically lower than the pressure in the compressed gas;

opening communication between the compressed gas and the heat engine expander when the heat engine expander's internal gas pressure cyclically matches substantially the pressure of the compressed gas within the cell;

transferring substantially all of the quantity of the compressed gas into the engine;

closing communication to the heat engine; and repeating the maintaining, opening, transferring and closing steps.

18. A method as recited in claim 17 above wherein said communication is opened during the cyclical process of pressure increase due to re-compression of remnant gases within the heat engine.

19. A method as recited in claim 17 above wherein said communication is opened during the cyclical process of pressure increase due to heat addition to working fluids contained within the heat engine.

20. A method as recited in claim 17 above wherein otherwise-waste engine heat is returned to the heat engine by absorption in the gas compressed externally to the heat engine.

21. A method as recited in claim 17 above wherein the maximum volume of the cell may be varied.

22. An engine comprising:

a substantially isothermal compressor means;

an expander means;

a cell connected to the expander means through a manifold;

an active displacer piston in the cell;

a pressure-sensitive transfer valve between the cell and the expander means;

a second cell connected to the first cell through the heat output side of a heat exchanger means;

an active displacer piston in the second cell;

a pressure-sensitive transfer valve between the first cell and the second cell;

an inlet valve into the second cell;

manifold means connecting the compressor means to the inlet valve into the second cell;

a mechanical coupling between the active displacer piston of the first cell and the active displacer piston of the second cell, said mechanical coupling arranged in such a manner that when the volume in one cell is increased by movement of the piston, the volume in the other cell is decreased by an equal amount;

manifold means connecting the expander exhaust port to heat input side of the heat exchanger means;

means for further heating the fluid compressed in the compressor means following the input of heat from the heat exchanger means;

linkage means for supplying power from the expansion means to the desired work load, the external compressor means, the valve actuation means and any auxiliary power means required for engine operation for:

(a) intermittently opening the inlet valve into the second cell when the volume of the second cell is minimal, and closing the inlet valve into the second cell when the volume of the second cell is maximal;

(b) intermittently opening he pressure-sensitive transfer valve between the first and second cells when the pressure between the first and second cell is equal, and closing the transfer valve between the first and second cell when the volume in the first cell is maximal; and (c) intermittently opening the pressure-sensitive transfer valve between the first cell and the expander means when the pressure within the first cell and the pressure within the expander means are equal, and closing the pressure-sensitive transfer valve between the first cell and the expander means when the volume in the first cell is minimal.

* * * * *